US009916151B2

United States Patent
Ye et al.

(10) Patent No.: US 9,916,151 B2
(45) Date of Patent: Mar. 13, 2018

(54) MULTIPLE-STAGE SECURE VEHICLE SOFTWARE UPDATING

(71) Applicant: Ford Global Technologies, LLC, Dearborn, MI (US)

(72) Inventors: Xin Ye, Westland, MI (US); Aldi Caushi, Northville, MI (US); John R. Bielawski, Jr., Dearborn, MI (US); Michael Raymond Westra, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/834,868

(22) Filed: Aug. 25, 2015

(65) Prior Publication Data

US 2017/0060559 A1    Mar. 2, 2017

(51) Int. Cl.
| | |
|---|---|
| *G06F 9/44* | (2006.01) |
| *G06F 9/445* | (2018.01) |
| *H04L 9/30* | (2006.01) |
| *H04L 29/06* | (2006.01) |
| *H04L 29/08* | (2006.01) |
| *H04W 12/10* | (2009.01) |
| *H04W 12/08* | (2009.01) |

(52) U.S. Cl.
CPC ............... *G06F 8/65* (2013.01); *H04L 9/30* (2013.01); *H04L 63/061* (2013.01); *H04L 67/12* (2013.01); *H04L 67/34* (2013.01); *H04W 12/10* (2013.01); *G06F 9/4401* (2013.01); *H04L 63/0823* (2013.01); *H04L 63/12* (2013.01); *H04L 2463/121* (2013.01); *H04W 12/08* (2013.01)

(58) Field of Classification Search
CPC ...................................................... G06F 8/65
See application file for complete search history.

(56) References Cited

U.S. PATENT DOCUMENTS

| | | | |
|---|---|---|---|
| 2004/0054952 A1* | 3/2004 | Morrow ................ | G06F 11/006 714/742 |
| 2005/0256614 A1 | 11/2005 | Habermas | |
| 2006/0005046 A1 | 1/2006 | Hars | |
| 2006/0107310 A1* | 5/2006 | Schmid ................... | H04L 63/08 726/4 |

(Continued)

OTHER PUBLICATIONS

Lobdell, Automotive, Industrial, & Multi-Market Solutions Group, Freescale Semiconductor, Inc., Jun. 2012, Robust Over-the-Air Firmware Updates Using Program Flash Memory Swap on Kinetis Microcontrollers. (20 pages).

*Primary Examiner* — Hang Pan
(74) *Attorney, Agent, or Firm* — Jennifer M. Stec; Brooks Kushman P.C.

(57) ABSTRACT

A vehicle may receive a software update to be installed to a vehicle electronic control unit (ECU). The vehicle ECU may download a software update received from a server to a first storage; generate a nonce value associated with the software update; send to the server, a swap authorization request including the generated nonce value; receive a swap authorization including the nonce value and a command-and-control signature from the server; validate the signature and the nonce value from the swap authorization; and reboot using the first storage instead of a second storage when the recovered nonce value matches the generated nonce value.

18 Claims, 7 Drawing Sheets

(56) References Cited

U.S. PATENT DOCUMENTS

| | | | |
|---|---|---|---|
| 2006/0259207 A1* | 11/2006 | Natsume | G06F 8/65 701/1 |
| 2007/0294537 A1* | 12/2007 | Peyravian | H04L 9/3242 713/178 |
| 2009/0138942 A1 | 5/2009 | Alrabady et al. | |
| 2010/0217997 A1* | 8/2010 | Chai | H04L 9/3271 713/181 |
| 2010/0325622 A1* | 12/2010 | Morton | G06F 8/68 717/168 |
| 2011/0131447 A1* | 6/2011 | Prakash | G06F 21/572 714/19 |
| 2012/0066499 A1* | 3/2012 | Ali | G06F 21/305 713/170 |

* cited by examiner

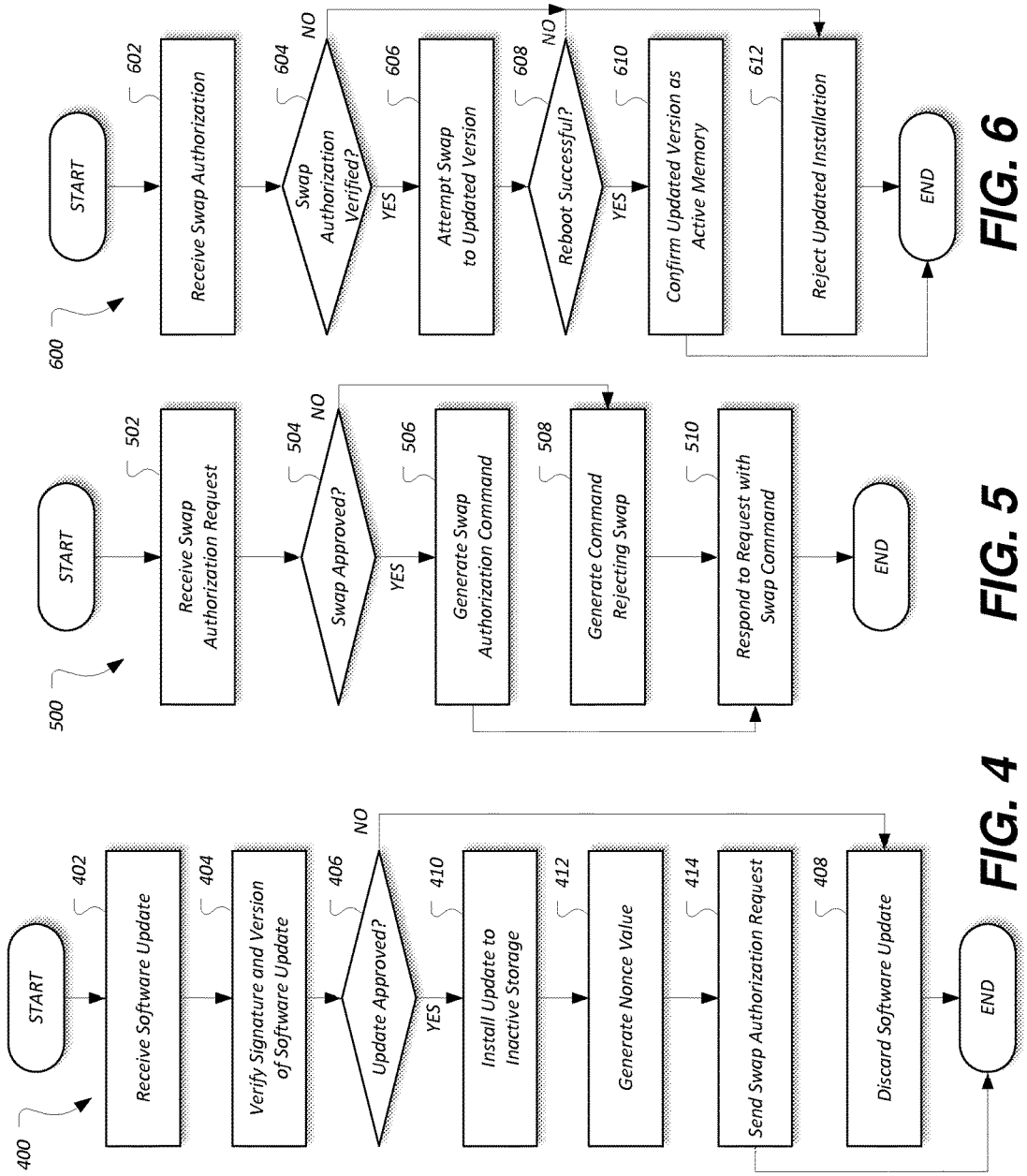

MULTIPLE-STAGE SECURE VEHICLE SOFTWARE UPDATING

TECHNICAL FIELD

Aspects of the disclosure relate to secure vehicle software updates, and more particularly to a two-stage update procedure including an installation stage and a server approval stage.

BACKGROUND

To update a software version of a component of a vehicle, the vehicle may be driven to a dealership and serviced by a technician. The technician may utilize a system that tracks the individual software levels of components in the vehicle as well as available software updates. The technician may manually apply the software updates indicated by the system and record any changes back into the system. The software update may be done while the vehicle is inoperable.

SUMMARY

In a first illustrative embodiment, a system includes a first storage; a second storage; and a vehicle electronic control unit (ECU), programmed to download a software update received from a server to the first storage, generate a nonce value associated with the software update, send, to the server, a swap authorization request including the nonce value, receive a swap authorization including the nonce value recovered from the server, and reboot using the first storage instead of the second storage when the nonce value generated by the ECU matches the nonce value recovered from the server.

In a second illustrative embodiment, a system includes a nonce value; and a server programmed to send a software update to a vehicle, receive, from the vehicle, a swap request including the nonce value and a hash value of the software update, and responsive to the swap request, send a swap authorization command to the vehicle, the swap authorization command including the nonce value and indicating whether the vehicle is authorized to swap to execution of the software update.

In a third illustrative embodiment, a method for over-the-air software updates includes generating a first nonce for a software update downloaded from a server to an electronic control unit (ECU); sending, to the server, a swap authorization request including the first nonce; receiving, from the server, a swap authorization including a second nonce; recovering the second nonce; and rebooting the ECU to utilize the software update when the first nonce matches the second nonce.

BRIEF DESCRIPTION OF THE DRAWINGS

FIG. 4 illustrates an example process for validating and installing software updates;

FIG. 5 illustrates an example process for processing swap authorization requests from vehicle ECUs; and FIG. 6 illustrates an example process for swapping and completing installation of software updates.

DETAILED DESCRIPTION

Figure 1:
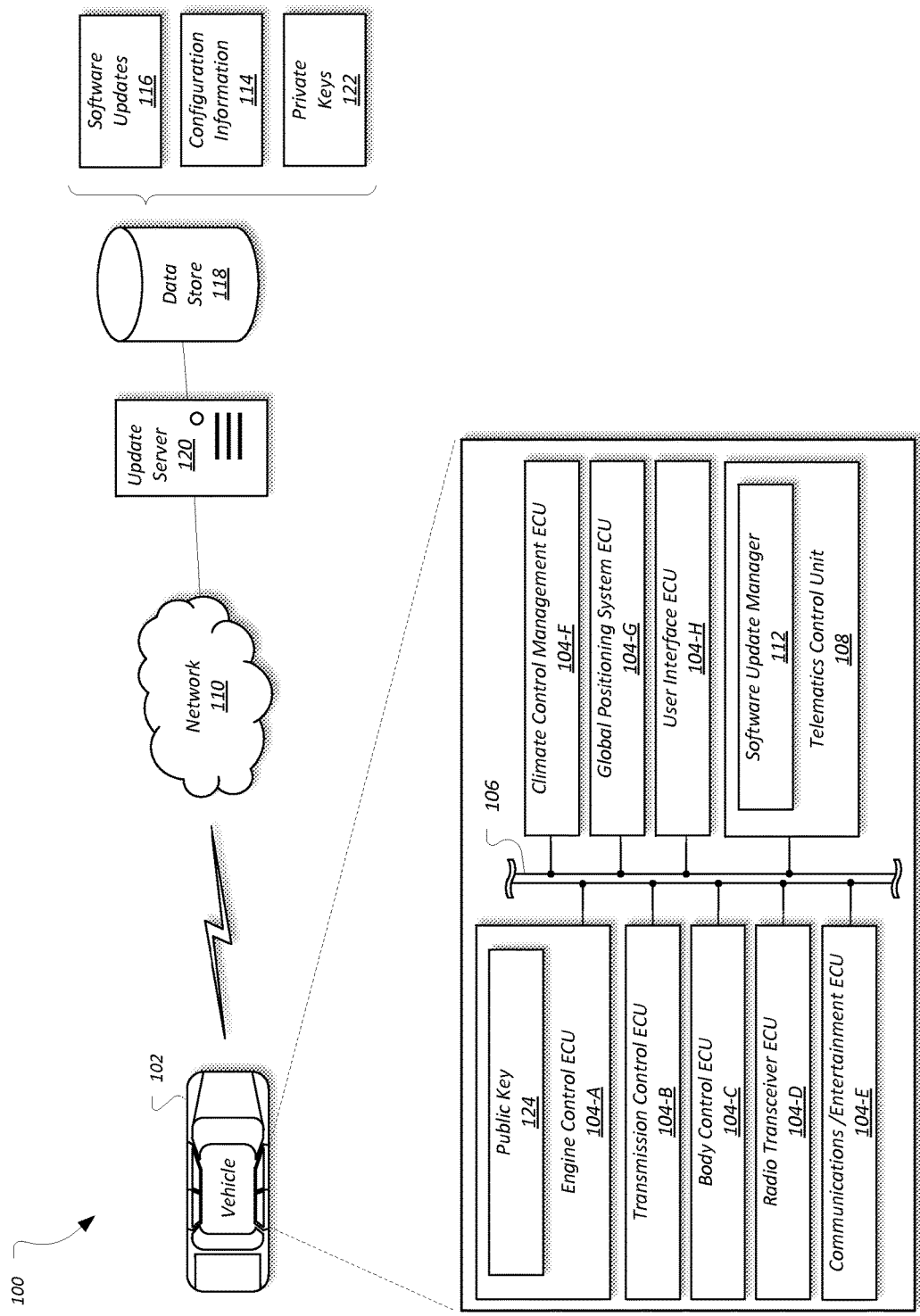
FIG. 1 illustrates an example system for providing software updates to a vehicle.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Software and firmware (referred to herein generally as software) plays an increasingly important role in modern automobiles. This increase in software may cause an increased potential for efficiency issues, functionality changes, and security flaws that may need to be addressed in vehicles out in the field. Thus, in many modern vehicle systems, vehicle electronic control units (ECUs) are configured with capability to undergo firmware updates after deployment. Updating firmware may be one solution to improving security of software installed to the ECUs of the vehicle. However, improper firmware updates may enable unauthorized or malicious software updates to be installed to the vehicle ECUs. Such inappropriate updates may cause malfunctioning of the vehicle ECUs or unauthorized vehicle operation.

An improved software update procedure may utilize two stages: a first stage in which a software update is downloaded from an update server and provided to a vehicle ECU for installation to an inactive storage, and a second stage in which a swap authorization command is granted for the vehicle ECU by the update server to allow the vehicle ECU to swap to the installation of the software update to the inactive storage. By using this two-stage process, the update server may be able to securely and reliably authorize vehicle ECUs in the field to swap their memories to proper installs of software updates. The memories may include, for example, program code, program data, resources, or other stored data related to the software installation.

More specifically, in the first stage, software may be delivered securely from a software repository of the update server to the vehicle. The update server may be configured to send the vehicle software updates in accordance with the configuration of the vehicle. These software updates to the most recent version of the software for the vehicle ECUs may be referred to herein as "approved versions." In an example, these software updates may be distributed with a cryptographically-strong signature created using a per-application private key to provide authenticity, integrity, and non-repudiation and which is verifiable by the vehicle ECUs in the field. Responsive to receiving the software and corresponding signature, the ECU may verify the signature using the application-specific public key. If the signature is verified and the version of the software is strictly higher than the current version, the ECU may initiate installation of the downloaded update. The ECU may include multiple memory storages, including an active storage including the current version of the software for execution by the ECU, and one or more inactive storages. The installation of the approved version update may be performed to one of the inactive storages. Responsive to the installation to the inactive memory storage, the vehicle ECU may inform the TCU of the status of the downloaded update, e.g., whether the software update was successfully verified using the public key, whether the software update was of a strictly higher version, and whether the software update was successfully flashed to the inactive memory storage.

In the second stage, the update server controls the swapping memory storages for activation of the installed software update. For instance, having confirmed that the approved version software update is successfully verified and installed to the inactive memory storage, the ECU may generate a swap request, requesting that the ECU swap from the current active version to the newly-installed approved version of the software. The TCU of the vehicle may send the swap authorization request to the update server. The update server may acknowledge the software download status and provide a swap authorization command bonded to the approved software version. For instance, the swap authorization command may be signed by the update server, e.g., with a unique-per-ECU serial number, with a non-repeating counter or nonce value included from the swap request, and a software version indication (such as a version number or hash of the software). The ECU receives the signed swap authorization command from the update server, and verifies the swap authorization command. These verifications may include, for example, verification of the sender or signature of the swap authorization command (e.g., using the public key), and/or verification that a counter, nonce value, or ECU serial number included in the swap authorization command matches that included in the swap authorization request from the vehicle ECU.

If the swap authorization command is approved, the vehicle ECU may initiate the swap to the new software version. In an example, the vehicle ECU may ensure or wait for suitable conditions to swap (e.g., which may be pre-programmed to the vehicle ECU when deployed, sent from the update server along with the swap authorization, etc.), mark in storage of the vehicle ECU that the updated memory storage is to be restarted as the active memory storage, and optionally initiate a reboot of the vehicle ECU. If the reboot is successful, the vehicle ECU may confirm the new install as being the active memory storage, and may set the formerly-active memory back to an inactive status. If the reboot fails, the vehicle ECU may again reboot back to the last-known-good install memory storage. Further aspects of the two-stage update procedure are described in detail below.

FIG. 1 illustrates an example system 100 for providing software updates 116 to a vehicle 102. The system 100 may include a telematics control unit 108 in communication over a network 110 with an update server 120 (e.g., via an in-vehicle modem, or via a data channel provided by mobile device of a vehicle occupant). The update server 120 may communicate with a data store 118 configured to maintain software updates 116 for download as well as vehicle configuration information 114 regarding the vehicles 102. The telematics control unit 108 may include a software update manager 112 configured to utilize the telematics control unit 108 to download software updates 116 for installation to the telematics control unit 108 or to other ECUs 104 of the vehicle 102. While an example system 100 is shown in FIG. 1, the example components as illustrated are not intended to be limiting. Indeed, the system 100 may have more or fewer components, and additional or alternative components and/or implementations may be used.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume.

The vehicle 102 may include a plurality of electronic control units (ECUs) 104 configured to perform and manage various vehicle 102 functions under the power of the vehicle battery and/or drivetrain. As depicted, the example vehicle ECUs 104 are represented as discrete ECUs 104-A through 104-H. However, the vehicle ECUs 104 may share physical hardware, firmware, and/or software, such that the functionality from multiple ECUs 104 may be integrated into a single ECU 104. Or, the functionality of various such ECUs 104 may be distributed across a plurality of ECUs 104. The vehicle ECUs 104 may include various vehicle 102 components configured to receive updates of associated software, firmware, or configuration settings.

As some non-limiting vehicle ECUs 104 examples: an engine control ECU 104-A may be configured to provide control of engine operating components; a transmission control ECU 104-B may be configured to utilize sensor data and data from the engine control ECU 104-A to calculate how and when to change gears in the vehicle 102 for optimum performance, fuel economy and shift quality; a body control ECU 104-C may be configured to manage various power control functions such as exterior lighting, interior lighting, keyless entry, remote start, and point of access status verification; a radio transceiver ECU 104-D may be configured to communicate with key fobs, mobile devices, or other local vehicle 102 devices; an entertainment control unit 104-E may be configured to support voice command and BLUETOOTH interfaces with the driver and driver carry-on devices; a climate control management ECU 104-F may be configured to provide control of heating and cooling system components (e.g., compressor clutch, blower fan, temperature sensors, etc.); a global positioning system (GPS) ECU 104-G may be configured to provide vehicle location information; and a human-machine interface (HMI) ECU 104-H may be configured to receive user input via various buttons or other controls, as well as provide vehicle status information to a driver.

The vehicle bus 106 may include various method of communication available between the vehicle ECUs 104. The vehicle bus 106 may also support communication between the telematics control unit 108 and the vehicle ECUs 104. As some non-limiting examples, the vehicle bus 106 may include one or more of a vehicle controller area network (CAN), an Ethernet network, and a media oriented system transfer (MOST) network. It should be noted that the illustrated bus topology is merely an example, and other number and arrangement of vehicle buses 106 may be used.

The telematics control unit 108 may include network hardware configured to facilitate communication between the vehicle ECUs 104 and with other devices of the system 100. For example, the telematics control unit 108 may include or utilize an in-vehicle cellular modem to facilitate communication over the communications network 110. The network 110 may include one or more interconnected communication networks such as the Internet, a cable television distribution network, a satellite link network, a local area network, a wide area network, and a telephone network, as some non-limiting examples. As another example, the telematics control unit 108 may utilize one or more of Bluetooth, Wi-Fi, and wired USB network connectivity to facilitate communication with the communications network 110 via the user's smartphone or other mobile device.

The software update manager 112 may be configured to utilize the telematics control unit 108 access the vehicle bus 106 to communicate with the vehicle ECUs 104. When a vehicle 102 is assembled, the vehicle 102 may include various hardware and software components. Upon or after assembly, the software update manager 112 may be configured to query for existence and version information for at least a portion of these hardware and software components of the vehicle ECUs 104 of the vehicle 102.

The software update manager 112 may be further configured to utilize the telematics control unit 108 to communicate with the update server 120 over the network 110. Using the queried information and additional information identifying the specific vehicle 102, the software update manager 112 may communicate via the network 110 to establish an account with the update server 120. The additional information identifying the vehicle 102 may include, as some non-limiting examples, VIN information published on the CAN bus, or subscriber identity module (SIM) information of the modem of the telematics control unit 108 such as international mobile station equipment identity (IMEI). The update server 120 may receive these communications from the vehicles 102, and may maintain a software data store 118 of vehicle configuration information 114 related to the received hardware configurations and software (e.g., firmware, etc.) versions linked to identifiers of the vehicles 102.

The software data store 118 may be further configured to store software updates 116 that may be provided to the vehicle 102. The software updates 116 may include changes to the software or settings of the vehicle 102 to address an issue with the current software or settings, or to provide improved functionality to the current software. The software updates 116 may include, for example, updated configuration settings for one or more vehicle ECUs 104, and/or updated versions of software or firmware to be installed on one or more vehicle ECUs 104. In some cases software updates 116 may include a single section, while in other cases a software updates 116 may be organized into multiple subsections, partitions, or chunks, where all the subsections may be downloaded to complete the overall software update 116 to be installed. In some examples, the software updates 116 may be originated by a vendor (e.g., of the vehicle ECU 104) or originated by the vehicle manufacturer. In some cases, the software updates 116 may be encrypted, while in other cases the software updates 116 may not be encrypted.

The software data store 118 may be further configured to store additional information about the software updates 116. For example, the software data store 118 may be configured to maintain an optional/required flag regarding the software updates 116 allowing the vehicles 102 to determine which software updates 116 are necessary and which are optional. As another example, the software data store 118 may be configured to maintain indications of which vehicle ECUs 104 are associated with which software updates 116. The software data store 118 may further store information indicative of the compatibility of the software updates 116 to vehicle model or configuration. For instance, a storage entry for a software update 116 may indicate that the software update 116 is compatible with a certain make and model of vehicle 102, or that it has a dependency on a version of another vehicle ECU 104 being of a particular software version or versions.

The update server 120 may include one or more devices configured to serve the software updates 116 stored by the data store 118 to the vehicles 102. For example, the update server 120 may be configured to receive the update requests for available software updates 116 from vehicles 102. The update requests may include vehicle information to allow the update server 120 to query the data store 118 for software updates 116 applicable to the vehicle 102 as it is currently configured. The update server 120 may provide, responsive to the update requests, indications of software updates 116 (or the software updates 116 themselves) to update the requesting vehicle 102 that may be downloaded and installed. The update server 120 may be further configured to provide the software updates 116 to devices requesting to download the software updates 116 according to the provided indications.

The software update manager 112 may be further configured to manage the installation of software updates 116. For example, the vehicle 102 may receive a command from a user requesting to check for software updates 116. As another possibility, the vehicle 102 may trigger a periodic check for new software updates 116. When triggered, the vehicle 102 may be configured to send an update request to the update server 120 to inquire whether software updates 116 for the vehicle 102 are available. For instance, the vehicle 102 may query the update server 120 using the vehicle information (or, if the data store 118 maintains current vehicle information, an identifier of the vehicle 102), and may receive a response from the update server 120 indicative of whether new software updates 116 for the vehicle 102 are available (e.g., as links or other identifiers of software updates 116 for the vehicle 102 to download). The determination of whether new updates are available may be based, for example, on the configuration information 114 maintained for the requesting vehicle 102. If the response to the vehicle 102 indicates software updates 116 are available for the vehicle 102, the vehicle 102 may be further configured to utilize the telematics control unit 108 to download the indicated software updates 116, or in other cases queue the software updates 116 to be downloaded.

The software update manager 112 may be further configured to provide a user interface for managing the software updates 116 to the user. For example, the software update manager 112 may be configured to provide a prompt to the user (e.g., via a display or speaker of the user interface module 104-G) informing the user that software updates 116 are available and requesting permission to proceed with installation of the software updates 116. As another possibility, the software update manager 112 may be configured to provide an indication of available updates within the gauge cluster of the vehicle 102 when software updates 116 are available (e.g., downloaded).

To enhance security of the downloading of software updates 116 to the vehicles 102, the system 100 may utilize asymmetric cryptography for validation of received information. For example, the data store 118 may maintain private keys 122 used to sign messages sent from the update server 120 to the vehicles 102, and the vehicle ECUs 104 may maintain public keys 124 that correspond to the private keys 122 that may be used to ensure that the messages sent from the update server 120 are authentically signed. The public key 124 of the engine control ECU 104-A is shown as an example in FIG. 1, but it should be noted that other ECUs 104 of the vehicle 102 also maintain their own respective public keys 124 as well. Notably, the telematics control unit 108 may also have its own respective public key 124 for updates to the telematics control unit 108 as another of the vehicle ECUs, although the public key 124 for the telematics control unit 108 may be applicable to updates to the telematics control unit 108 and not to the other ECUs 104. Variations are possible in which symmetric keys may be used rather than private key 122/public key 124 pairs.

Once the user confirms that the software updates 116 should be installed and/or upon other vehicle triggers such as key-on or key-off, the software update manager 112 may be configured to initiate various functions useful in support of the updating of the software of the vehicle ECUs 104. For example, the software update manager 112 may be configured to invoke a software update mode by providing a message from the software update manager 112 to the vehicle modules ECUs 104 over the vehicle bus 106. The software update manager 112 may be further configured to provide the software updates 116 to the vehicle ECUs 104 identified by the software updates 116 as recipients of the software updates 116 for validation and installation. The recipient vehicle ECUs 104 may accordingly receive the software updates 116 for compatibility testing and installation.

In some vehicle 102 systems, installation of a software update 116 may require the vehicle 102 to be inoperable, as the storage devices (e.g., a flash memory) utilized by the vehicle ECUs 104 to maintain the executed software cannot both operate and be re-flashed with the software update 116 at the same time. However, in some cases the vehicle ECUs 104 may include multiple storage areas, such that a software update 116 may be installed to one storage area of the vehicle ECU 104 while a current version of the software may be executed from another storage area of the vehicle ECU 104.

Figure 2A:
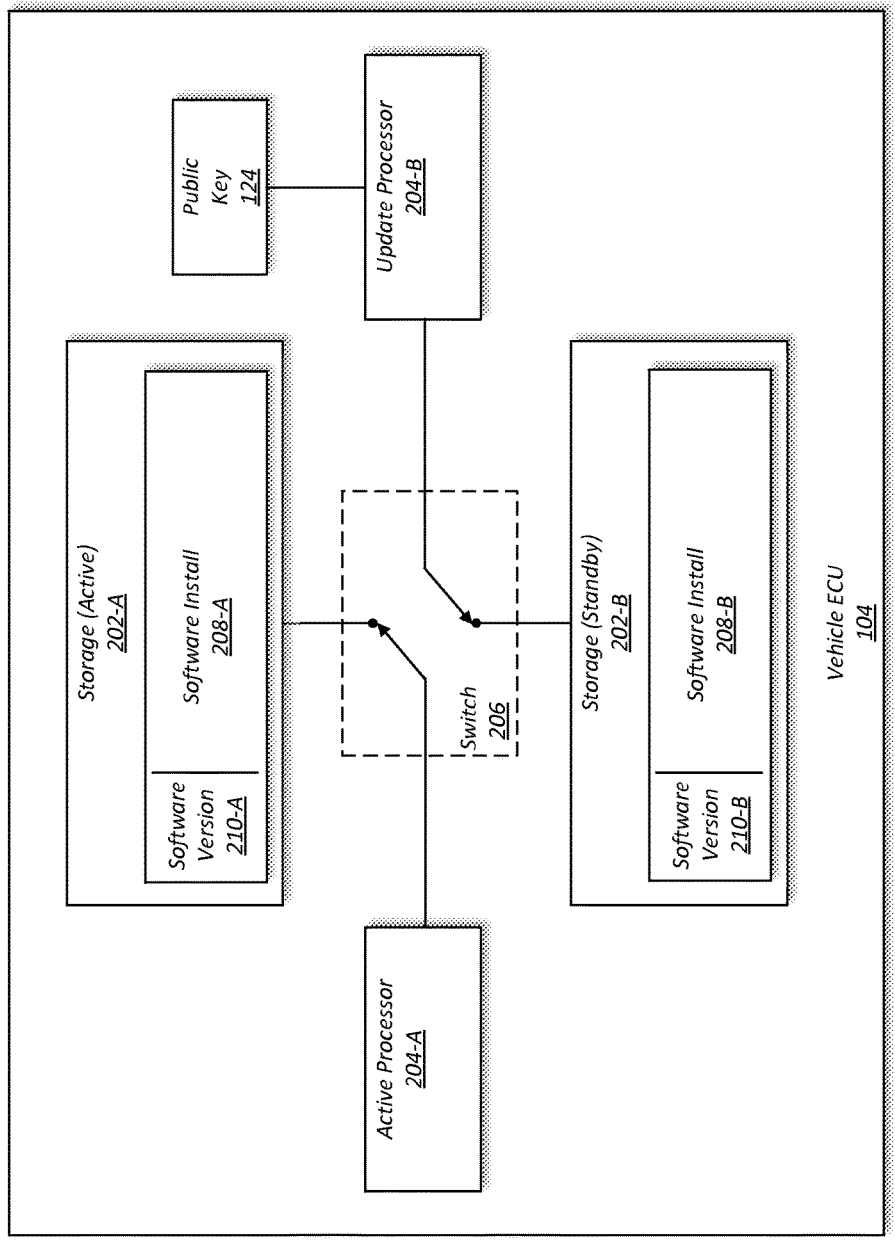
FIGS. 2A and 2B illustrate examples of the programmable memories for installation of software updates to a vehicle ECU.
Figure 2B:
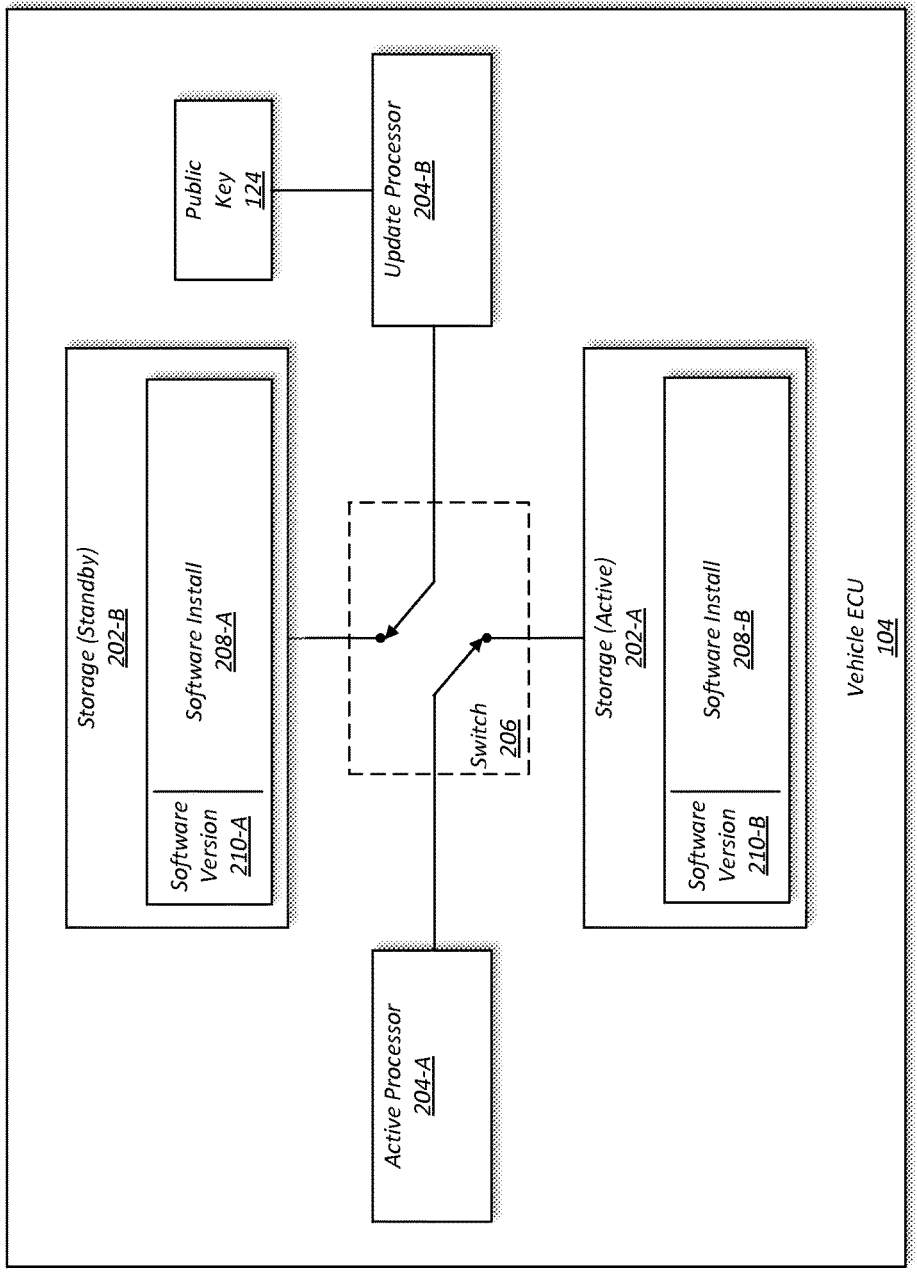

FIG. 2A illustrates an example of the programmable memory circuit 200 for a vehicle ECU 104 having multiple storage 202 areas. As shown, the programmable memory circuit 200 may include an active storage 202-A, an inactive storage 202-B, an active processor 204-A, an update processor 204-B, and a switch 206. The active storage 202-A may include a software install 208-A at a software version 210-A, and the inactive storage 202-B may include a software install 208-B at a software version 210-B. The programmable memory circuit 200 may further include or otherwise have access to the public key 124 of the vehicle ECU 104 that may be used to facilitate verification of received software updates 116. In a first state of the switch 206 (as shown in FIG. 2A), the active processor 204-A may be coupled to the active storage 202-A, and the update processor 204-B may be coupled to the inactive storage 202-B. In a second state of the switch 206 (as shown in FIG. 2B), the switch 206 may reverse which storage 202 is the active storage 202-A, and which storage 202 is the inactive storage 202-B. Accordingly, in the second state of the switch 206, active processor 204-A may be coupled to what was formerly the inactive storage 202-B as the new active storage 202-A, and the update processor 204-B may be coupled to what was formerly the active storage 202-A as the new inactive storage 202-B. Thus, by toggling of the switch 206, the programmable memory circuit 200 may switch which of the software installs 208-A or 208-B is to be executed by the active processor 204-A.

For instance, the vehicle ECU 104 may utilize the active processor 204-A to execute the software install 208-A installed to the active storage 202-A for vehicle 102 operation, while utilizing the update processor 204-B to install the software update 116 as the software install 208-B of the inactive storage 202-B. In such an example, while the software update 116 is being installed, the vehicle ECU 104 may continue to utilize the active processor 204-A coupled to the storage 202-A to continue to execute the software install 208-A without interruption.

When the vehicle ECU 104 having installed the software update 116 to the inactive storage 202-B receives confirmation to swap to the installed software update 116, the vehicle ECU 104 may be configured to toggle the switch 206 to cause the inactive storage 202-B to become the new active storage 202-A, and for the current active storage 202-A to become the new inactive storage 202-B. This toggling of the switch 206 may be performed at the next initialization event for the vehicle 102. The initialization event may include, as some non-limiting examples, vehicle key-on, vehicle key-off, and/or a vehicle ECU 104 re-initialization event.

Figure 2C:
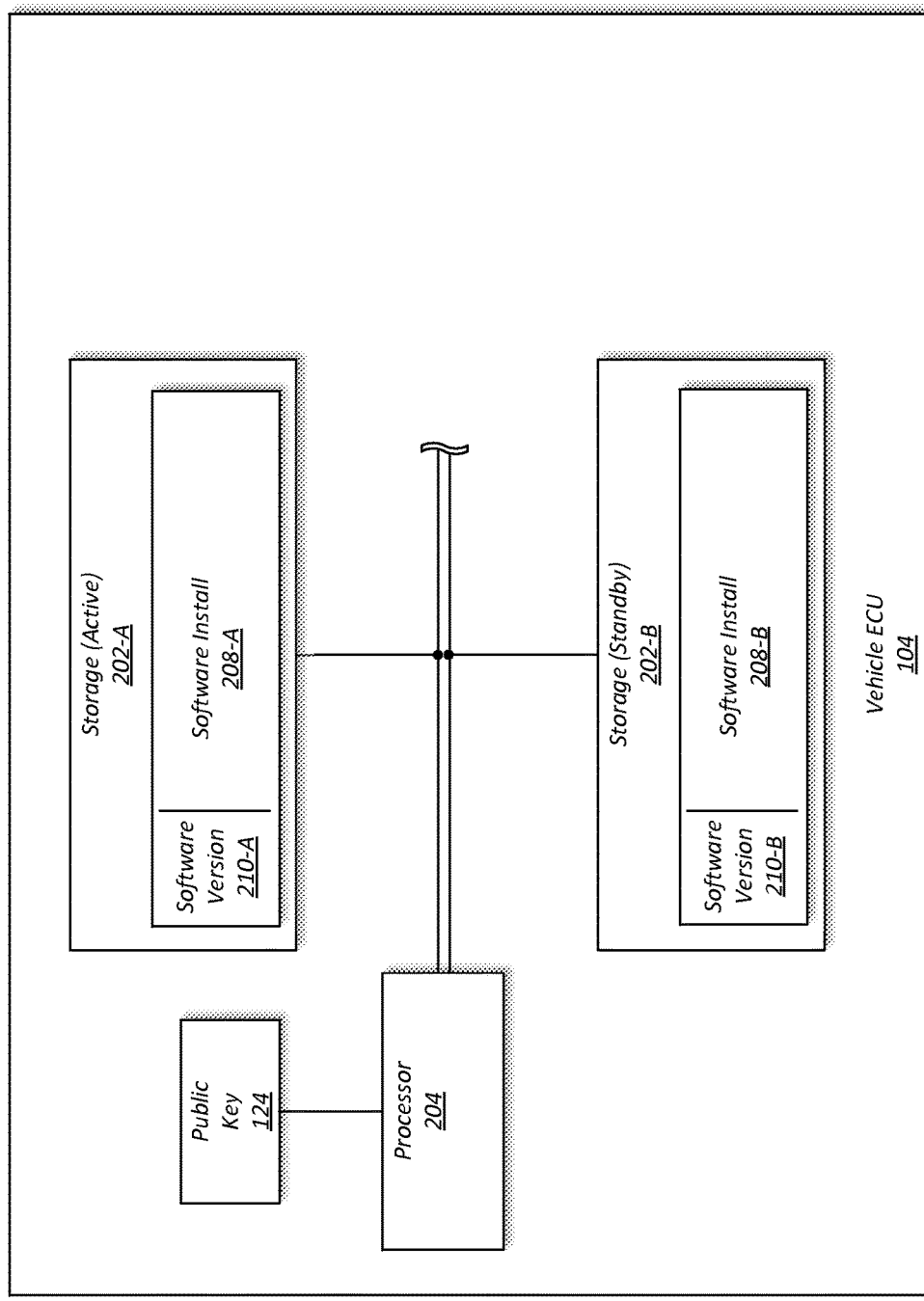
FIGS. 2C and 2D illustrate alternate examples of the programmable memories for installation of software updates to a vehicle ECU.
Figure 2D:
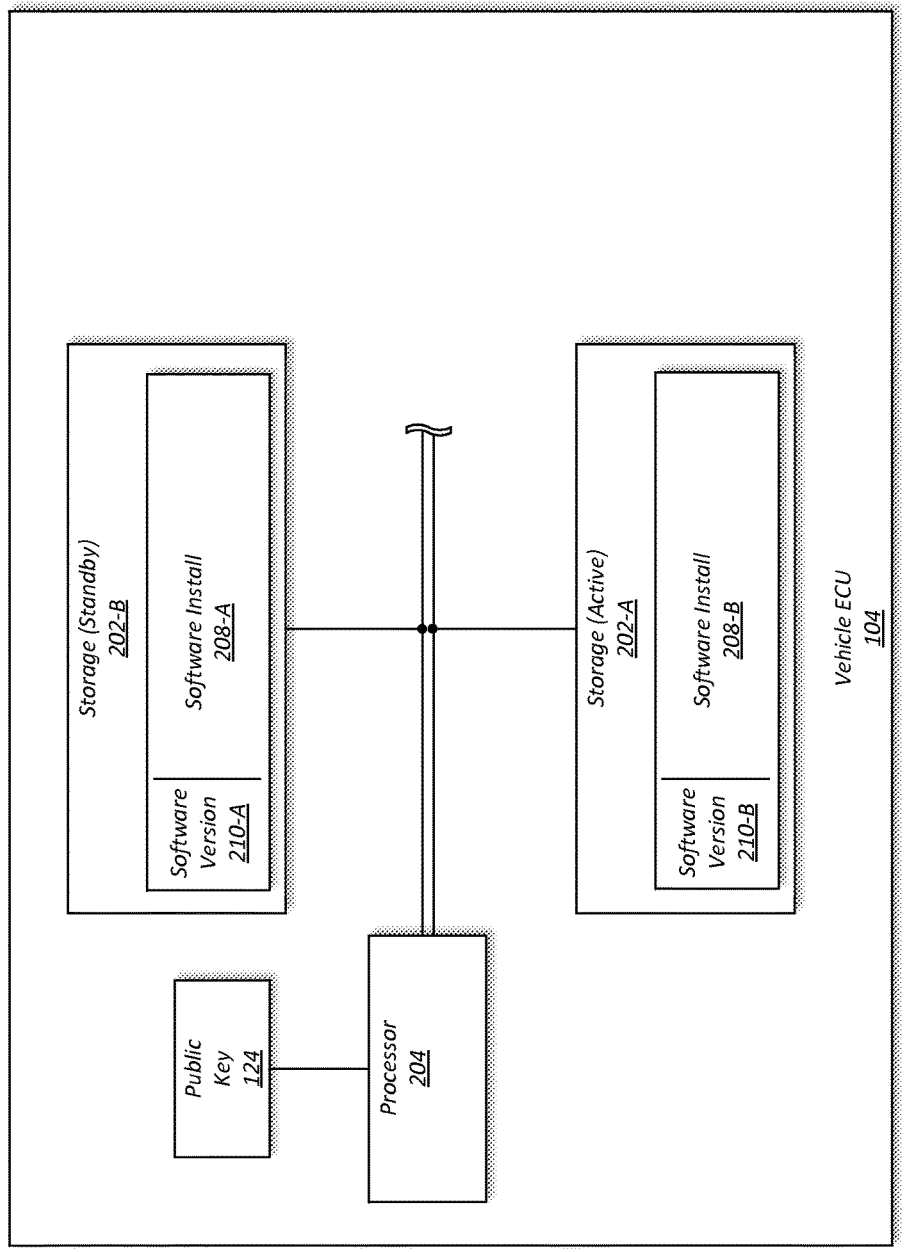

As another example, FIGS. 2C and 2D illustrates a programmable memory circuit 200 including an active storage 202-A, an inactive storage 202-B, and a processor 204. As compared to the processors 204-A and 204-B of FIGS. 2A and 2B, the processor 204 may perform both the execution of the software install 208-A of the active storage 202-A, and also the updating of the software install 208-B using the inactive storage 202-B. The programmable memory circuit 200 may further include or otherwise have access to the public key 124 of the vehicle ECU 104 that may be used to facilitate verification of received software updates 116. Similar to the FIGS. 2A and 2B, the processor 204 in the FIG. 2C may switch which storage 202 is the active storage 202-A and which is the inactive storage 202-B based on application of updates.

Or, as a further example (not shown), the storage 202-A may store the software install 208, and the storage 202-B may store the software update 116. In such an example, the software update 116 may include a differential of updates to be applied to the software install 208 to update the software install 208 from the software version 210-A to the software version 210-B. This differential approach to the software update 116 may allow for easier downloading of the software update 116. When the vehicle ECU 104 having received the software update 116 to the inactive storage 202-B receives confirmation to swap to the software update 116, the vehicle ECU 104 may be configured to install the software update 116 to the storage 202-A.

Figure 3:
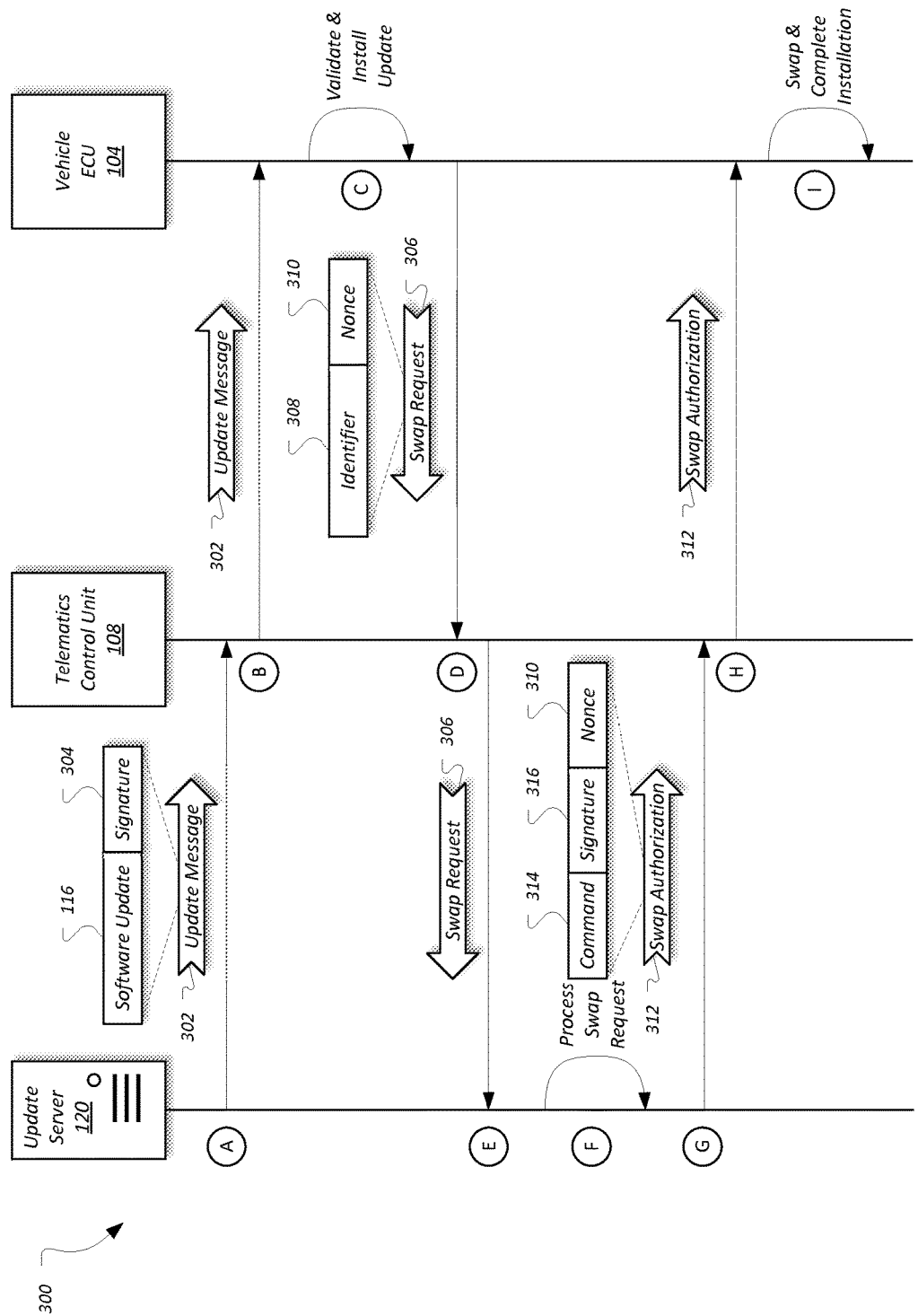
FIG. 3 illustrates an example data flow for installing a software update to one of the vehicle ECUs.

FIG. 3 illustrates an example data flow 300 for installing a software update 116 to one of the vehicle ECUs 104. The interaction may be performed, for example, by the telematics control unit 108 in communication with the vehicle ECU 104 over the vehicle bus 106 and with the update server 120 over the communications network 110.

At time index (A), the update server 120 sends an update message 302 to the vehicle 102 over the communications network 110. The update message 302 may include, for example a software update 116 to be applied to the vehicle ECU 104. As an example, the update server 120 may send the software update 116 to the vehicle 102 in accordance with the configuration information 114 maintained for the requesting vehicle 102. As one possibility, the update server 120 may communicate with the telematics control unit 108 of the vehicle 102 over secure hypertext transport protocol (HTTPS). The software update 116 may include data that, when installed to the vehicle ECU 104, places the vehicle ECU 104 at the most recent version of the software for the vehicle ECU 104 (i.e., the "approved version" of the software for the vehicle ECU 104). The update server 120 may further include a cryptographically-strong signature 304 with the update message 302 along with the software update 116. The signature 304 may be created using a private key 122 maintained by the data store 118 and associated with the vehicle ECU 104 to be updated. The signature 304 may accordingly be utilized to provide authenticity, integrity, and non-repudiation, and may be verifiable by the vehicle ECU 104 in the field.

At time index (B), the telematics control unit 108 receives the update message 302 having the software update 116 and the signature 304, and provides the software update 116 and signature 304 to the vehicle ECU 104 to be updated. In an example, the telematics control unit 108 may utilize an identifier of the vehicle ECU 104 included in the software update 116 to direct the software update 116 and signature 304 to the correct vehicle ECU 104 over the vehicle bus 106. The vehicle ECU 104 may accordingly receive the software update 116 and signature 304.

At time index (C), the vehicle ECU 104 validates and installs the software update 116. In an example, responsive to receiving the software update 116 and corresponding signature 304, the vehicle ECU 104 may verify the signature 304 using the public key 124. If the signature 304 is verified and the version of the software update 116 is strictly higher than the software install 208 version 210-A installed to the active storage 220-A of the vehicle ECU 104 (e.g., not the same as or a lower version), the vehicle ECU 104 may initiate installation of the downloaded software update 116 to the inactive storage 202-B. Responsive to the installation to the inactive storage 202-B, the vehicle ECU 104 may inform the telematics control unit 108 of the status of the downloaded software update 116, e.g., whether the software update 116 was successfully verified using the public key 124, whether the software update 116 was of a strictly higher version than that installed to the active storage 202-A, and whether the software update 116 was successfully flashed to the inactive storage 202-B.

At time index (D), the vehicle ECU 104 sends a swap request 306 to the telematics control unit 108. For instance, having confirmed that the approved version software update 116 is successfully verified and installed to the inactive storage 202-B, the vehicle ECU 104 may generate a swap request 306, requesting that the update server 120 allow the vehicle ECU 104 to swap from software install 208-A installed to the active storage 220-A to the newly-installed approved software install 208-B installed to the inactive storage 220-B. The swap request 306 may include an identifier 308, such as a unique identifier of the vehicle 102, a unique identifier of the vehicle ECU 104 being updated, and/or an identifier of the software update 116 that was installed to the inactive storage 202-B. The swap request 306 may further include a nonce 310 value generated by the vehicle ECU 104 (e.g., a incremented counter value, a random number, a time stamp, etc.) and/or a hash value based on the software install 208-B after the application of the software update 116 to the inactive storage 202-B. The telematics control unit 108 may receive the swap request 306 from the vehicle ECU 104 over the vehicle bus 106. Further aspects of the operations at time indexes (C) and (D) are described below with respect to FIG. 4.

At time index (E) the telematics control unit 108 sends the swap request 306 to the update server 120. The update server 120 accordingly receives the swap request 306 from the vehicle 102.

At time index (F), the update server 120 verifies the swap request 306. In an example, the update server 120 may receive the swap request 306, and send a swap authorization command 312. In other examples, the swap authorization command 312 may only be sent if the swap request 306 is approved. The swap authorization command 312 may include one or more of a swap command 314, a signature 316, and the nonce value 310. To approve the swap request 306, the update server 120 may require that the hash value included in the swap request 306 match a value maintained by the data store 118 that should have been computed for a proper download of the software update 116 (or in other cases for a proper installation of the software update 116). The swap authorization command 312 to be sent to the vehicle 102 may include a signature 316 that is signed by the update server 120 (or the command-and-control server) using configuration information 114 for the vehicle 102 requesting the swap (e.g., with a serial number unique to the vehicle ECU 104 of the vehicle 102, with a non-repeating counter value, and/or using a software version indication (such as a version number of the active software version or a hash generated from the software update 116 installed to the vehicle ECU 104)). Further aspects of the operations at time index (F) are described below with respect to FIG. 5.

At time index (G), the update server 120 sends the swap authorization command 312 to the vehicle 102. The telematics control unit 108 accordingly receives the swap authorization command 312 from the update server 120.

At time index (H), the telematics control unit 108 sends the swap authorization command 312 to the vehicle ECU 104. In an example, the telematics control unit 108 may utilize an identifier of the vehicle ECU 104 included in the swap authorization command 312 to direct the swap authorization command 312 to the correct vehicle ECU 104 over the vehicle bus 106. The vehicle ECU 104 may accordingly receive the swap authorization command 312.

At time index (I), the vehicle ECU 104 swaps and completes the installation of the software update 116. In an example, the vehicle ECU 104 may validate the signature 316 of the swap authorization command 312, and if valid (and if the command 314 indicates approval to swap), ensure or wait for suitable conditions to swap. The conditions to begin the swap may be pre-programmed to the vehicle ECU 104 when deployed, or sent from the update server 120 along with the swap authorization command 312. The vehicle ECU 104 may further mark in storage of the vehicle ECU 104 that the inactive storage 202-B is to be restarted as the active storage 202-A, and optionally initiate a reboot of the vehicle ECU 104. Upon reboot, the vehicle ECU 104 may toggle the switch 206 to cause the inactive storage 202-B to become the new active storage 202-A, and for the current active storage 202-A to become the new inactive storage 202-B. If the reboot is successful, the vehicle ECU 104 may confirm the new active storage 202-A as being the active storage 202-A, and may confirm the formerly-active memory to be the new inactive storage 202-B. If the reboot fails, the vehicle ECU 104 may again reboot back to the last-known-good install memory storage (i.e., the previous active storage 202-A). Further aspects of the operation at time index (I) are described below with respect to FIG. 6.

FIG. 4 illustrates an example process 400 for validating and installing software updates 116 to the vehicle ECU 104. The process 400 may be performed, in an example, by the vehicle ECUs 104 in communication with the telematics control unit 108 over the vehicle bus 106.

At operation 402, the vehicle ECU 104 receives the software update 116. In an example, the vehicle ECU 104 receives an update message 302 the telematics control unit 108 responsive to the update server 120 determining that the vehicle 102 should receive a software update 116 to the vehicle ECU 104.

At operation 404, the vehicle ECU 104 verifies the signature 304 and version of the software update 116. In an example, the vehicle ECU 104 may utilize the public key 124 maintained by the vehicle ECU 104 to ensure that the received software update 116 was provided by the update server 120 using the private key 122 maintained by the data store 118. In another example, the vehicle ECU 104 may confirm that the version of the software update 116 is a greater version number than that software version 210-A of the software install 208-A to the active storage 202-A of the vehicle ECU 104.

At operation 406, the vehicle ECU 104 determines whether the software update 116 is approved to be installed. In an example, if the verifications at operation 404 are successful, then the software update 116 may be approved for installation. Additionally or alternately, the software update manager 112 may be configured to prompt the user for approval to install the software update 116, and may indicate the approval from the user to install the software update 116 to the vehicle ECU 104. If the software update 116 is approved for installation, control passes to operation 410. Otherwise, control passes to operation 408.

At operation 408, the vehicle ECU 104 discards the software update 116. After operation 408, the process 400 ends.

At operation 410, the vehicle ECU 104 installs the software update 116 to inactive storage 202-B of the vehicle ECU 104. In an example, the vehicle ECU 104 may install the software update 116 to the inactive storage 202-B of the vehicle ECU 104. The vehicle ECU 104 may perform the installation using the update processor 204-B, allowing the active processor 204-A to continue to perform vehicle ECU 104 operations using the active storage 202-A.

At operation 412, the vehicle ECU 104 generates a nonce 310 value. In an example, the vehicle ECU 104 may utilize the update processor 204-B to generate a random number or incremented counter value. As some other possibilities, the vehicle ECU 104 may additionally or alternatively may utilize one or more of a hash value included with the software update 116 or a signature of the swap authorization request.

At operation 414, the vehicle ECU 104 sends a swap authorization request 306. In an example, the vehicle ECU 104 may create the swap authorization request 306 including the nonce 310 value, hash value, signature value, and/or identifier 308 of the vehicle ECU 104. The vehicle ECU 104 may send the swap authorization request 306 to the telematics control unit 108, to be sent to the update server 120 for approval. After operation 414, the process 400 ends.

FIG. 5 illustrates an example process 500 for processing swap authorization requests 306 from vehicle ECUs 104. The process 500 may be performed, in an example, by the update server 120 in communication with the data store 118 and the communications network 110.

At operation 502, the update server 120 receives the swap authorization request 306. In an example, the update server 120 may receive the swap authorization request 306 from the telematics control unit 108 as described above with respect to operation 414 of the process 400.

At operation 504, the update server 120 determines whether to approve the swap authorization request 306. In an example, the update server 120 may verify that a hash value included in the swap authorization request 306 matches a hash value maintained by the data store 118 for the software update 116, or in other examples that should have been computed for a proper installation of the software update 116. If the swap authorization request 306 is approved, control passes to operation 506. Otherwise control passes to operation 508.

At operation 506, the update server 120 generates the swap authorization command 312. In an example, the update server 120 generates a signature 316 using configuration information 114 for the vehicle 102 requesting the swap (e.g., with a serial number unique to the vehicle ECU 104 of the vehicle 102, with a non-repeating counter value, and/or using a software version indication (such as a version number of the active software version or a hash generated from the software update 116 installed to the vehicle ECU 104)). After operation 506, control passes to operation 510.

At operation 508, the update server 120 generates the swap authorization command 312 rejecting the swap. In an example, the update server 120 generates a swap authorization command 312 directly the vehicle 102 to not swap to the updated version. After operation 506, control passes to operation 510.

At operation 510, the update server 120 sends the swap authorization command 312 to the vehicle ECU 104 of the vehicle 102. In an example, the update server 120 may return the swap authorization command 312 to the sender vehicle 102 indicated by the swap authorization command 312. After operation 504, the process 500 ends.

FIG. 6 illustrates an example process 600 for swapping and completing installation of software updates 116. The process 600 may be performed, in an example, by the vehicle ECU 104 in communication with the telematics control unit 108 over the vehicle bus 106.

At operation 602, the vehicle ECU 104 receives the swap authorization command 312. In an example, the vehicle ECU 104 may receive the swap authorization command 312 from the update server 120 as described above with respect to operation 504 of the process 500.

At operation 604, the vehicle ECU 104 determines whether the swap is authorized by the update server 120. In an example, the vehicle ECU 104 may validate the signature 316 of the swap authorization command 312 using the public key 124 to ensure that the signature 316 is valid. In another example, the vehicle ECU 104 may validate that the nonce 310 value generated by the vehicle ECU 104 at operation 412 and sent to the update server 120 at operation 414 is the same as the nonce value 310 recovered from the signature of the swap authorization command 312. In yet a further example, the vehicle ECU 104 may verify that a swap approval command 314 in the swap authorization command 312 indicate approval for the vehicle 102 to perform the swap. In some examples, the vehicle ECU 104 may perform two or more of these validations, and may require that all of the validations pass. If the swap is determined to be authorized by the vehicle ECU 104, control passes to operation 606. Otherwise, control passes to operation 616.

At operation 606, the vehicle ECU 104 attempts the swap to the software update 116. In an example, the vehicle ECU 104 may ensure safe conditions to perform the swap, which may be pre-programmed to the vehicle ECU 104 when deployed, sent from the update server 120 along with the swap authorization command 312, etc.), mark in storage 202 of the vehicle ECU 104 that the updated memory storage 202-B is to be restarted as the active memory storage 202-A, and either initiate a reboot of the vehicle ECU 104 or otherwise wait for the reboot to occur (e.g., at the next vehicle 102 key-on cycle).

At operation 608, the vehicle ECU 104 determines whether the reboot was successful. In an example, the vehicle ECU 104 may determine whether the newly activated software install 208-b successfully booted to the vehicle ECU 104 without error. If so, control passes to operation 610. Otherwise, control passes to operation 612.

At operation 614, the vehicle ECU 104 confirms the updated version of the software install 208-B including the software update 116 as being the new active software install 208-A. Accordingly, the vehicle ECU 104 may set the new install as being the active memory storage 202-A, and may set the formerly-active storage back to an inactive status. After operation 614, the process 600 ends.

At operation 616, the vehicle ECU 104 may reject the updated installation. Instead, the vehicle ECU 104 may again reboot back to the last-known-good install memory storage. After operation 616, the process 600 ends.

Thus, by using the two-stage update procedure, the vehicle ECUs 104 may be able to ensure security goals over the software update process. For example, the vehicle ECUs 104 may be able to ensure that the received software update 116 is authentic, uncorrupted, and avoid impersonation attacks. Moreover, to avoid back-version attacks, the vehicle ECUs 104 may be able to refuse software updates 116 to older versions of the software, even those having a valid signature 304. Yet further, the vehicle ECUs 104 may also be able to refuse unauthorized requests for swapping between memory storages 202 in a multi-storage 202 vehicle ECU 104.

In general, computing systems and/or devices such as the vehicle ECUs 104, telematics control unit 108, and update server 120 may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS or QNX operating systems distributed by Research In Motion of Waterloo, Canada, and the Android operating system developed by the Open Handset Alliance.

Computing devices such as the vehicle ECUs 104, telematics control unit 108, and update server 120 generally include computer-executable instructions that may be executable by one or more processors of the computing devices. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computing device). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores, such as the data store 118 described herein, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. Some or all of the operations disclosed herein as being performed by the vehicle ECUs 104, telematics control unit 108, software update manager 112, and update server 120 may be such computer program products. In some example, these computer program products may be provided as software that when executed by one or more processors provides the operations described herein. Alternatively, the computer program products may be provided as hardware or firmware, or combinations of software, hardware and/or firmware.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a first storage;
a second storage; and
a vehicle electronic control unit (ECU), including a hardware processor, programmed to download a software update received from a server to the first storage,
generate a nonce value associated with the software update, the nonce value including a unique-per-module serial number of the ECU and a time stamp concatenated to a hash value of the software update,
send, to the server, a swap authorization request to switch to the software update including the nonce value,
receive a swap authorization including the nonce value recovered from the server, and
reboot using the first storage instead of the second storage when the nonce value generated by the ECU matches the nonce value recovered from the server.

2. The system of claim 1, wherein the vehicle ECU is further programmed to confirm the first storage as being active for booting instead of the second storage, responsive to the vehicle ECU successfully booting to the first storage.

3. The system of claim 1, wherein the swap authorization includes a signature signed using a private key of the server, and the vehicle ECU is further programmed to verify the signature using a public key installed to the vehicle ECU.

4. The system of claim 1, wherein the vehicle ECU is further programmed to:
receive a signature of the software update from the server; and
verify authenticity of the software update using the signature and a key installed to the vehicle ECU.

5. The system of claim 4, wherein the key is one of a public key corresponding to a private key with which the software update is signed, or a symmetric key with which the software update is signed.

6. The system of claim 1, wherein the vehicle ECU is further programmed to discard the software update when the nonce value recovered from the server fails to match the nonce value as generated.

7. The system of claim 1, wherein the vehicle ECU is further programmed to apply the software update to the first storage while the vehicle ECU executes a software installation to the second storage of the vehicle ECU.

8. A system comprising:
a nonce value including a unique-per-module serial number of an electronic control unit (ECU) and a time stamp concatenated to a hash value of a software update; and
a server, including a hardware processor, programmed to
send the software update to a vehicle for installation to the ECU,
receive, from the vehicle, a swap request to switch to the software update including the nonce value, and
responsive to the swap request, send a swap authorization command to the vehicle, the swap authorization command including a second nonce value, thereby directing the vehicle to reboot using a first storage instead of a second storage when the nonce value generated by the ECU matches the second nonce value sent by the server.

9. The system of claim 8, further comprising a data store programmed to maintain software updates, wherein the server is further programmed to retrieve the software update from the data store.

10. The system of claim 8, wherein the server is further programmed to:
generate a signature using at least one of a private key matched to a public key stored by the vehicle or a symmetric key stored by the vehicle; and
include the signature with the swap authorization command.

11. The system of claim 8, wherein the server is further programmed to:
retrieve a hash value corresponding to the software update from a database; and
determine whether the hash value of the software update is a match by comparing the hash value of the swap request to the hash value from the database.

12. A method comprising:
generating a nonce, for a software update downloaded to a storage of a controller, including a unique identifier of the controller and a time stamp concatenated to a hash value of the software update;
sending, to a server, a swap authorization request including the nonce;
receiving, from the server, a swap authorization including a second nonce; and
rebooting using the storage over a second storage when the nonce matches the second nonce.

13. The method of claim 12, further comprising confirming the storage as being active for booting instead of a second storage, responsive to the controller successfully booting to the storage.

14. The method of claim 12, wherein the software update includes a differential of updates to be applied to a software install of the controller, and further comprising applying the software update to the software install responsive to rebooting the controller when the nonce matches the second nonce.

15. The method of claim 12, wherein the swap authorization includes a signature, and further comprising verifying the signature using a key installed to the controller.

16. The method of claim 12, further comprising:
receiving a signature of the software update; and
verifying authenticity of the software update using the signature and a key installed to the controller.

17. The method of claim 12, further comprising discarding the software update when the second nonce fails to match the nonce.

18. The method of claim 12, further comprising applying the software update to a first storage operating as an inactive storage while the controller executes a software installation to a second storage acting as an active storage of the controller.

\* \* \* \* \*